(12) United States Patent
Yan (10) Patent No.: US 9,200,835 B2
(45) Date of Patent: Dec. 1, 2015

(54) ALIGNMENT FILM DRYING SYSTEM AND A METHOD FOR DRYING ALIGNMENT FILMS

(75) Inventor: Maocheng Yan, Shenzhen (CN)

(73) Assignee: Shenzhen China Star Optoelectronics Technology Co. Ltd., Shenzhen (CN)

( * ) Notice: Subject to any disclaimer, the term of this patent is extended or adjusted under 35 U.S.C. 154(b) by 1075 days.

(21) Appl. No.: 13/265,868

(22) PCT Filed: Aug. 3, 2011

(86) PCT No.: PCT/CN2011/077952
§ 371 (c)(1),
(2), (4) Date: Oct. 22, 2011

(87) PCT Pub. No.: WO2013/029213
PCT Pub. Date: Mar. 7, 2013

(65) Prior Publication Data
US 2013/0019491 A1    Jan. 24, 2013

(51) Int. Cl.
*F26B 3/347* (2006.01)
*F26B 3/34* (2006.01)
(52) U.S. Cl.
CPC .............. *F26B 3/347* (2013.01); *F26B 3/343* (2013.01); *F26B 2210/00* (2013.01)
(58) Field of Classification Search
CPC ...... F26B 3/343; F26B 3/347; F26B 2210/00; C09K 19/56

USPC ............. 34/248, 259, 265, 187; 349/123–136
See application file for complete search history.

(56) References Cited

U.S. PATENT DOCUMENTS

| | | | | |
|---|---|---|---|---|
| 6,900,875 | B2 * | 5/2005 | Nakano et al. | 349/187 |
| 7,643,117 | B2 * | 1/2010 | Iida et al. | 349/117 |
| 2006/0174508 | A1 * | 8/2006 | Govek et al. | 34/265 |
| 2008/0225210 | A1 * | 9/2008 | Shimoda et al. | 349/96 |
| 2010/0126035 | A1 * | 5/2010 | Kobayashi et al. | 34/259 |
| 2012/0066867 | A1 * | 3/2012 | Nimmo | 19/48 R |

FOREIGN PATENT DOCUMENTS

| | | | |
|---|---|---|---|
| CN | 1423159 A | 6/2003 | |
| CN | 2888372 Y | 4/2007 | |
| JP | 2001125107 A * | 5/2001 | G02F 1/1337 |

* cited by examiner

*Primary Examiner* — David J Laux
(74) *Attorney, Agent, or Firm* — Mark M. Friedman (57) ABSTRACT

An alignment film drying system and a method for drying alignment films are proposed. The alignment film drying system is used for drying an alignment film coated on a substrate. The alignment film drying system includes a plurality of magnetrons. The alignment liquid is coated on one side of the substrate facing the plurality of magnetrons and is heated through electromagnetic radiation produced by the plurality of magnetrons. The dried alignment liquid forms an alignment film having a uniform thickness, which ensures that the display effect of LCDs is better.

8 Claims, 5 Drawing Sheets

ALIGNMENT FILM DRYING SYSTEM AND A METHOD FOR DRYING ALIGNMENT FILMS

BACKGROUND OF THE INVENTION

1. Field of the Invention

The present invention relates to liquid crystal displays (LCDs), and more particularly, to system for drying alignment films and a method for drying alignment films.

2. Description of the Prior Art

Recently the applications and developments of optoelectronics and semiconductor technology are increasing. Liquid crystal displays (LCDs) have been widely used in various fields of art. An LCD device comprises two glass substrates and a liquid crystal (LC) layer between the two glass substrates. Among variants of LCDs, thin film transistor liquid crystal displays (TFT-LCDs) are the mainstream.

TFT-LCD manufacturing processes are mainly divided into three parts: to form patterns on the two glass substrates, to seal LCs to form LC cells between the two glass substrates, and to package the LC cells as a liquid crystal module (LCM).

A plurality of LC cells are disposed on the glass substrates for the practical process. The number and the position of LC cells disposed on the substrates vary with the product model and the size of the substrates. The plurality of LC cells will form a single LC cell after LCs are sealed and cut.

While the LCs are sealed between the two glass substrates to form the LC cells, an alignment film is disposed on an LC cell region (or a display area, and a non-display area for the other area) of each of the glass substrates. After a rubbing process is performed on the alignment film, the alignment film disposed on the display area of the glass substrate leads to the LCs being uniformly arranged in a specific direction.

In the conventional technology, the process for forming the alignment film on the glass substrates comprises the following steps:

(1) Film coating: An alignment film material diluted with a solvent is formed on the surface of the substrates through the use of printing technology and so on. The alignment film material commonly used is polyimide. The solvent commonly used to dilute the alignment film material comprises N-methyl-2-pyrrolidone (NMP), γ-butyrolactone (GBL), and 2-butoxyethanol (BC).

(2) Drying: The solvent is evaporated at about 100° C. until a uniform alignment film is formed.

(3) Roasting: The alignment film is cured at a temperature above 180° C.

Figure 1:
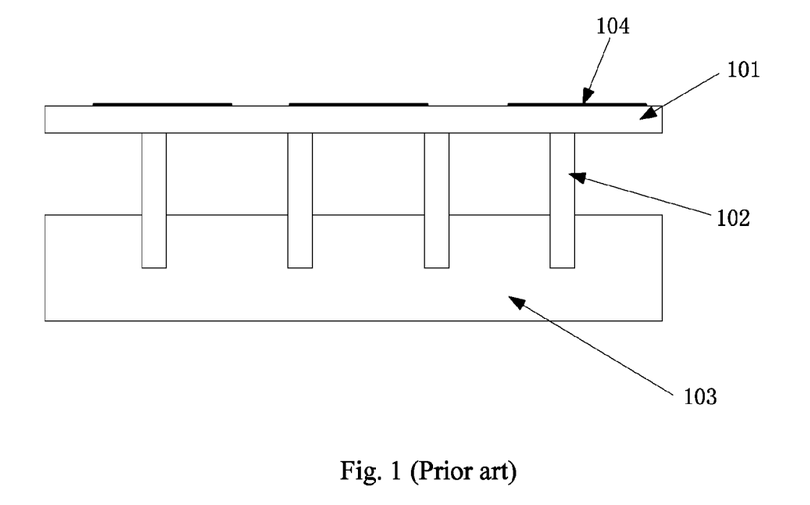
FIG. 1 shows a schematic diagram of heating alignment liquid coating on alignment film coating areas of a substrate film according to prior art.

There will be two problems in the step of drying. Referring to FIG. 1, a substrate 101 is generally placed on a plurality of support pins 102. A plurality of alignment film coating areas 104 on the substrate 101 are heated by a heat plate 103. The thermal energy from the heat plate 103 is conducted to the substrate 101 through convection and thermal radiation, which slows the heating. Besides, the heating method includes heating the substrate 101 and then conducting the thermal energy from the substrate 101 to an alignment liquid on the alignment film coating areas 104, as shown in FIG. 1. So, the problems are that:

(a) In the step of drying, the plurality of alignment film coating areas 104 are not uniformly heated from the margins to the center, leading to different evaporation rates of the solvent on the plurality of alignment film coating areas 104. Accordingly, the thickness of the margins of the alignment film is not uniform, leading to the alignment ability of the margins of the alignment film differing from that of the center of the alignment film. Finally, the display operates abnormally.

(b) The substrate 101 is not heated uniformly, for the temperature of touch positions of the plurality of support pins 102 and the substrate 101 is different from that of the other area of the substrate 101. So the alignment film disposed on the plurality of support pins 102 is inclined to suffer abnormal dryness and have abnormal alignment ability, leading to a bad display quality.

In sum, whether or not the alignment liquid on the plurality of alignment coatings on the substrate is evenly heated to form an alignment film having a uniform thickness and to ensure the display effect of LCDs is one of the technical problems in LCD productions.

SUMMARY OF THE INVENTION

It is therefore an object of the present invention to provide an alignment film drying system for resolving a problem that the thinkness of an alignment film is not uniform because an alignment liquid is not evenly heated in the conventional technology.

According to the present invention, an alignment film drying system for drying an alignment liquid coated on a substrate is provided. The alignment film drying system comprises a plurality of magnetrons. The alignment liquid is coated on one side of the substrate facing the magnetrons. The alignment liquid is heated through electromagnetic radiation produced by the magnetron to form an alignment film.

The alignment film drying system comprises a drying chamber in which the plurality of magnetrons are placed.

The alignment film drying system further comprises a temperature control device comprising a temperature-feedback sensor for detecting the internal temperature of the drying chamber, and a thermostat for lowering the temperature once the temperature-feedback sensor discovers that the internal temperature of the drying chamber exceeds a threshold for the alignment film drying system.

The drying chamber comprises a roller inside.

The drying chamber further comprises an entrance and an exit so that the substrate is put into or taken out of the drying chamber via the entrance and the exit, the substrate driven by the roller being put into the drying chamber via the entrance being heated through electromagnetic radiation produced by the plurality of magnetrons, and then being taken out of the drying chamber.

In one aspect of the present invention, the alignment film drying system comprises a plurality of magnetrons forming a honeycomb-like structure.

In another aspect of the present invention, the alignment film drying system further comprises a gas circulation device comprising an inlet pipe and an exhaust pipe, the plurality of magnetrons are placed in a gap between the substrate and the inlet pipe, the inlet pipe is used for being a passage through which a gas is injected to the drying chamber, the gas flows to the alignment liquid on the substrate after being heated by the plurality of magnetrons and dries the alignment liquid, and the heated gas is expelled through the exhaust pipe.

It is another object of the present invention to provide an alignment film drying system for resolving a problem that the thinkness of an alignment film is not uniform because an alignment liquid is not evenly heated in the conventional technology.

According to the present invention, an alignment film drying system for drying an alignment liquid coated on a substrate is proposed. The alignment film drying system comprises a plurality of magnetrons. The alignment liquid is coated on one side of the substrate facing the magnetron, and the alignment liquid is heated through electromagnetic radiation produced by the magnetron to form an alignment film.

In one aspect of the present invention, the alignment film drying system comprises a plurality of magnetrons forming a honeycomb-like structure.

In one aspect of the present invention, the alignment film drying system further comprises a drying chamber in which the plurality of magnetrons are placed.

In one aspect of the present invention, the alignment film drying system further comprises a gas circulation device comprising an inlet pipe and an exhaust pipe, the plurality of magnetrons are placed in a gap between the substrate and the inlet pipe, the inlet pipe is used for being a passage through which a gas is injected to the drying chamber, the gas flows to the alignment liquid on the substrate after being heated by the plurality of magnetrons and dries the alignment liquid, and the heated gas is expelled through the exhaust pipe.

In one aspect of the present invention, the alignment film drying system further comprises a temperature control device comprising a temperature-feedback sensor and a thermostat;

the temperature-feedback sensor is used for detecting the internal temperature of the drying chamber; and the thermostat is used for lowering the temperature once the temperature-feedback sensor discovers that the internal temperature of the drying chamber exceeds a threshold for the alignment film drying system.

In one aspect of the present invention, the drying chamber comprises a roller inside;

the drying chamber further comprises an entrance and an exit so that the substrate is put into or taken out of the drying chamber via the entrance and the exit, the substrate driven by the roller being put into the drying chamber via the entrance, being heated through electromagnetic radiation produced by the plurality of magnetrons, and then being taken out of the drying chamber.

In one aspect of the present invention, inner walls of the drying chamber are coated with an electromagnetic radiation absorbing material;

the drying chamber comprises a valve; and the valve comprises a seal for preventing the electromagnetic radiation inside the drying chamber from leaking outside while the valve is closed.

It is another object of the present invention to provide a method of drying an alignment film for resolving a problem that the thinkness of an alignment film is not uniform because an alignment liquid is not evenly heated in the conventional technology.

According to the present invention, a method of drying an alignment film comprising:

putting a substrate coating alignment liquid into a drying chamber via a valve of the drying chamber and closing the valve;

heating the alignment liquid by electromagnetic radiation produced by magnetrons; and taking out the substrate from the drying chamber via the opened valve after a alignment film is formed by the alignment liquid.

In one aspect of the present invention, the step of heating the alignment liquid by electromagnetic radiation produced by magnetrons further comprises:

injecting gas into the drying chamber through a inlet pipe;

drying the alignment liquid through the gas heated by the plurality of magnetrons and flowing to the alignment liquid; and expelling the heated gas through a exhaust pipe.

In one aspect of the present invention, the step of heating the alignment liquid by electromagnetic radiation produced by magnetrons further comprises:

detecting an internal temperature of the drying chamber; and lowering the internal temperature of the drying chamber when the detected internal temperature over a threshold.

The alignment liquid is directly heated through electromagnetic radiation (E-M radiation, EMR) produced by a plurality of magnetrons in the present invention, which resolving the problem existing in the conventional technology that the thickness of the alignment film is not uniform because the alignment liquid is not evenly heated while the thermal energy is conducted from the substrate to the alignment liquid. Moreover, the prevent invention has other benefits: the uniformity of the drying effect is not affected, and the heat loss is little, shortening the heating time.

DETAILED DESCRIPTION OF THE PREFERRED EMBODIMENTS

These and other objectives of the claimed invention will no doubt become obvious to those of ordinary skill in the art after reading the following detailed description of the preferred embodiment that is illustrated in the various figures and drawings.

An alignment liquid is evenly heated through electromagnetic radiation in the alignment film drying system of the present invention, which ensures that the thickness of the alignment film is uniform and that the display effect of LCDs is better.

Figure 2:
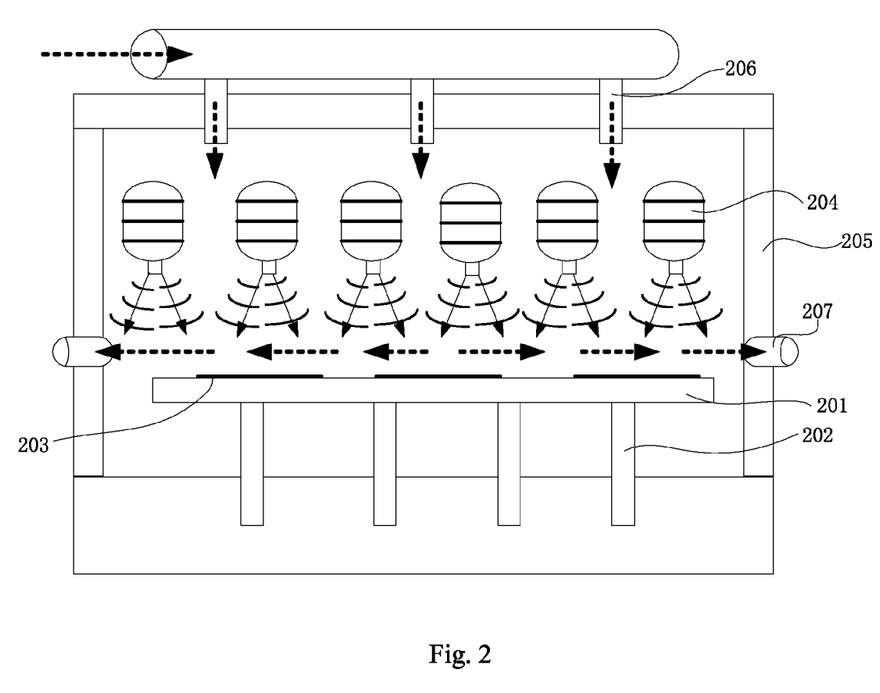
FIG. 2 is a schematic diagram of an alignment film drying system is shown according to a first preferred embodiment of the present invention.

Referring to FIG. 2, a schematic diagram of an alignment film drying system is shown according to a first preferred embodiment of the present invention.

As shown in FIG. 2, the alignment film drying system comprises a plurality of support pins 202, a plurality of magnetrons 204, a drying chamber 205, and a gas circulation device. The plurality of support pins 202 are used for supporting a substrate 201 on which a plurality of alignment film coating areas 203 are disposed. The plurality of alignment film coating areas 203 are coated with an alignment liquid used for forming alignment films. Preferably, the length of the plurality of support pins 202 is determined based on the condition that the substrate 201 can be put into or taken out of the drying chamber 205 conveniently. As for the number of support pins 202, four support pins 202 are used in this embodiment, as shown in FIG. 2. Actually, there is no limit to the number of support pins 202 in the present invention. In other words, the number of support pins 202 may increase, decrease, or stay the same depending upon practical demands.

As shown in FIG. 2, the plurality of alignment film coating areas 203 are disposed on one side of the substrate 201 facing the plurality of magnetrons 204. The alignment liquid on the plurality of alignment film coating areas 203 is heated through electromagnetic radiation produced by the plurality of magnetrons 204 so as to form the alignment film. Preferably, the electromagnetic radiation produced by the plurality of magnetrons 204 includes microwaves; otherwise, other forms of electromagnetic radiation are feasible.

Figure 4:
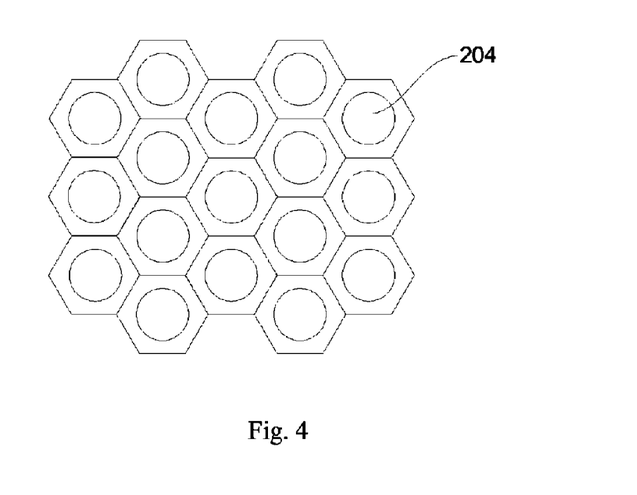
FIG. 4 shows a schematic diagram of the plurality of structurally arranged magnetrons in the alignment film drying system.

Preferably, the alignment film drying system comprises the plurality of magnetrons 204. FIG. 4 shows a schematic diagram of the plurality of structurally arranged magnetrons 204 in the alignment film drying system. The plurality of magnetrons 204 form a honeycomb-like structure so that electromagnetic radiation produced by the plurality of magnetrons 204 can reach the substrate 201 evenly.

As shown in FIG. 2, the plurality of support pins 202 and the plurality of magnetrons 204 all are placed in the drying chamber 205. Inner walls of the drying chamber 205 are coated with an electromagnetic radiation absorbing material such as silicone rubber (SI) used for absorbing unnecessary electromagnetic radiation. In this way, electromagnetic radiation will not be reflected back to the plurality of magnetrons 204, preventing causing damage to the plurality of magnetrons 204. In addition, the electromagnetic radiation absorbing material coated on the inner wall of the drying chamber 205 precludes microwaves produced by the plurality of magnetrons 204 from leaking outside.

In the embodiment as shown in FIG. 2, the gas circulation device comprises an inlet pipe 206 and an exhaust pipe 207. The inlet pipe 206 is a passage through which a gas is injected into the drying chamber 205. The plurality of magnetrons 204 are placed in the gap between the substrate 201 and the inlet pipe 206. The gas flowing from the inlet pipe 206 is heated by the plurality of magnetrons 204. Then, the gas flows to the alignment liquid on the plurality of alignment film coating areas 203, implementing the drying for the alignment liquid and increasing the speed of drying the alignment liquid on the substrate 201. The exhaust pipe 207 is a passage through which the heated gas is expelled. The flow of the gas is in the direction of a dotted arrow in FIG. 2.

The alignment film drying system further comprises a temperature control device (not shown) which comprises a temperature-feedback sensor and a thermostat in this embodiment. The temperature-feedback sensor is used for detecting the internal temperature of the drying chamber 205 to achieve the best effect of drying on the alignment liquid. The temperature of the alignment liquid will rise too high once electromagnetic radiation is produced excessively, causing the alignment liquid to boil too fast. Once the temperature-feedback sensor discovers that the internal temperature of the drying chamber 205 exceeds a threshold for the alignment film drying system (e.g., above 180° C.), the thermostat will cool down the drying chamber 205. In addition, the internal temperature of the drying chamber 205 can be lowered by controlling the power of the plurality of magnetrons 204.

The drying chamber 205 is at a temperature range of 80° C.-180° C. where 120° C. is the optimal temperature for the practical process.

Figure 3:
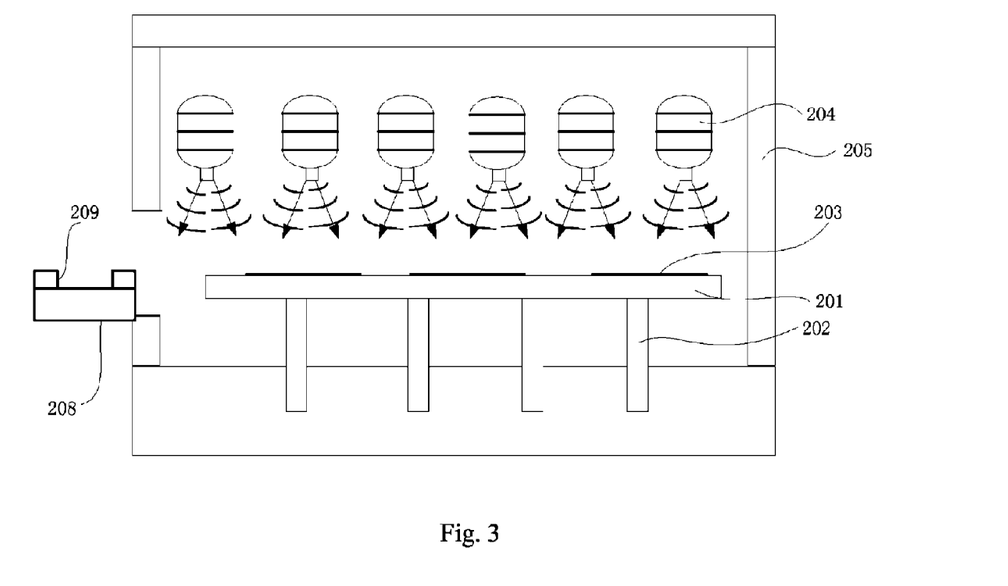
FIG. 3 is a side view of FIG. 2.

Referring to FIG. 3, a side view of FIG. 2 is shown.

In the present invention, the drying chamber 205 comprises a valve 208. The location of the valve 208 corresponds to that of the substrate 201 so that the substrate 201 can be put into or taken out of the drying chamber 205 through the valve 208. A seal 209 is mounted on the valve 208 and is used for preventing the electromagnetic radiation inside the drying chamber 205 from leaking outside while the valve 208 is closed.

Referring to FIG. 2 to FIG. 4, the working principle of the first preferred embodiment of the present invention is explained as follows:

Referring to FIG. 3, the gas circulation device is switched on for the gas to be injected into the drying chamber 205 through the inlet pipe 206 and to be expelled through the exhaust pipe 207. The gas circulation device keeps operations.

The valve 208 is opened. The substrate 201 coated with the alignment liquid is put onto the plurality of support pins 202 by using a robotic arm. Afterwards, the valve 208 is closed. The plurality of magnetrons 204 start to operate. The alignment liquid on the substrate 201 is directly heated through electromagnetic radiation produced by the plurality of magnetrons 204. Meanwhile, the gas heated by the plurality of magnetrons 204 flows to the alignment liquid coated on the plurality of alignment film coating areas 203. The internal temperature of the drying chamber 205 is detected with the temperature control device. The power of the plurality of magnetrons 204 is controlled depending upon the internal temperature of the drying chamber 205.

After the completely dried alignment liquid on the substrate 201 forms the alignment film, the plurality of magnetrons 204 stop operating. Then, the valve 208 is opened and the substrate 201 is taken out with the robotic arm. The drying process for the alignment film on the substrate 201 is done. The optimal duration for drying the alignment film is 20-60 seconds.

In this embodiment, the present invention provides the following benefits:

(A1) The alignment liquid is directly heated through electromagnetic radiation produced by the plurality magnetrons 204, resolving the problem that the thickness of the alignment film is not uniform resulting from the unevenly heated alignment liquid while the thermal energy is conducted to the alignment liquid from the substrate 201.

(B1) The alignment liquid is directly heated through electromagnetic radiation produced by the plurality magnetrons 204 so that the uniformity of the drying effect on the alignment film from is not affected by the plurality of support pins 202.

(C1) The alignment liquid is directly heated through electromagnetic radiation produced by the plurality magnetrons 204 so the heat loss is little, improving the heating speed.

Figure 5:
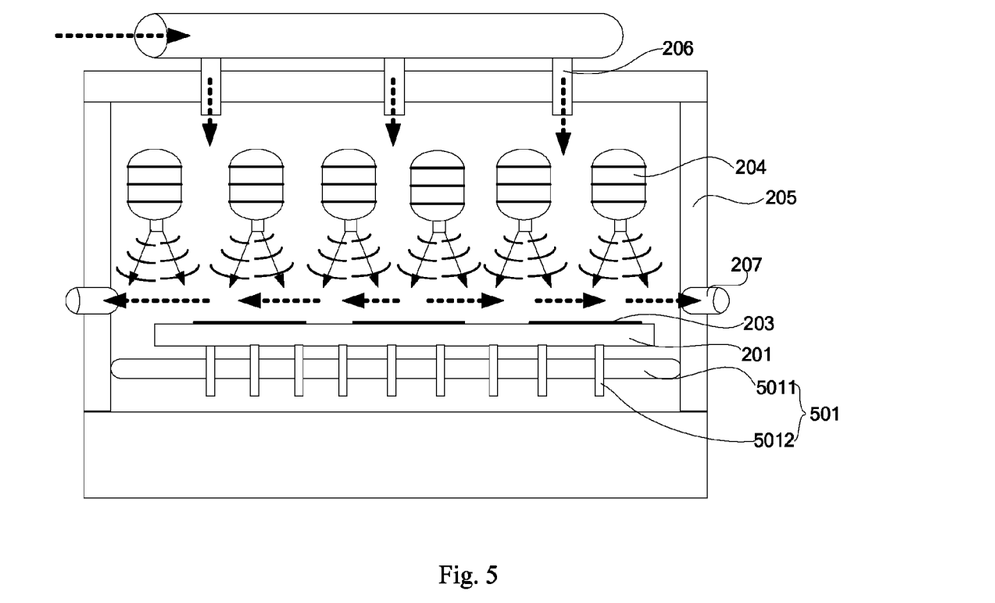
FIG. 5 shows a schematic diagram of an alignment film drying system is shown according to a second preferred embodiment of the present invention.

Referring to FIG. 5, a schematic diagram of an alignment film drying system is shown according to a second preferred embodiment of the present invention.

The alignment film drying system comprises a roller 501, a plurality of magnetrons 204, a drying chamber 205, and a gas circulation device in the embodiment as shown in FIG. 5. The roller 501 is used for supporting a substrate 201 and for driving the substrate 201 to move in a horizontal direction. A plurality of alignment film coating areas 203 on which an alignment liquid is coated arc disposed on the substrate 201. The alignment liquid is used for forming alignment films.

As shown in FIG. 5, the plurality of alignment film coating areas 203 are disposed on one side of the substrate 201 facing the plurality of magnetrons 204. The alignment liquid on the plurality of alignment film coating areas 203 is heated through electromagnetic radiation produced by the plurality of magnetrons 204 so as to form the alignment film. Preferably, the electromagnetic radiation produced by the plurality of magnetrons 204 includes microwaves; otherwise, other forms of electromagnetic radiation are feasible.

Preferably, the alignment film drying system comprises the plurality of magnetrons 204. FIG. 4 shows a schematic diagram of the plurality of structurally arranged magnetrons 204 in the alignment film drying system. The plurality of magnetrons 204 form a honeycomb-like structure so that electromagnetic radiation produced by the plurality of magnetrons 204 can reach the substrate 201 evenly.

As shown in FIG. 5, the roller 501 and the plurality of magnetrons 204 both are placed in the drying chamber 205. Inner walls of the drying chamber 205 are coated with an electromagnetic radiation absorbing material such as SI used for absorbing unnecessary electromagnetic radiation. In this way, electromagnetic radiation will not be reflected back to the plurality of magnetrons 204, preventing causing damage to the plurality of magnetrons 204. In addition, the electromagnetic radiation absorbing material coated on the inner wall of the drying chamber 205 precludes microwaves produced by the plurality of magnetrons 204 from leaking outside.

In the embodiment as shown in FIG. 5, the gas circulation device comprises an inlet pipe 206 and an exhaust pipe 207. A gas is injected into the drying chamber 205 through the inlet pipe 206. The plurality of magnetrons 204 are placed in the gap between the substrate 201 and the inlet pipe 206. The gas flowing from the inlet pipe 206 is heated by the plurality of magnetrons 204. Afterwards, the gas flows to the alignment liquid on the plurality of alignment film coating areas 203, implementing the drying for the alignment liquid on the substrate 201 and increasing the speed of drying the alignment liquid on the substrate 201. The heated gas is expelled through the exhaust pipe 207. The flow of the gas is in the direction of a dotted arrow in FIG. 5.

The alignment film drying system further comprises a temperature control device (not shown) which comprises a temperature-feedback sensor and a thermostat in this embodiment. The temperature-feedback sensor is used for detecting the internal temperature of the drying chamber 205 to achieve the best effect of drying on the alignment liquid. The temperature of the alignment liquid will rise too high once electromagnetic radiation is produced excessively, causing the alignment liquid to boil too fast. Preferably, the drying chamber 205 is at a temperature range of 80° C.-180° C. where 120° C. is the optimal temperature. Once the temperature-feedback sensor discovers that the internal temperature of the drying chamber 205 exceeds a threshold for the alignment film drying system (e,g., above 180° C.), the thermostat will cool down the drying chamber 205. In addition, the internal temperature of the drying chamber 205 can he lowered by controlling the power of the plurality of magnetrons 204.

Figure 6:
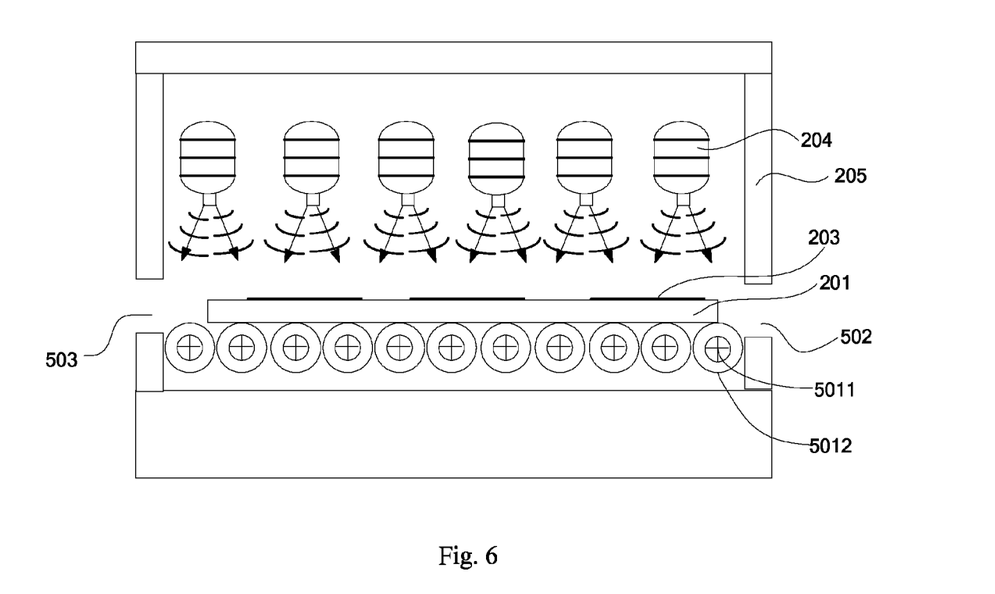
FIG. 6 is a side view of FIG. 5.

Referring to FIG. 5 and FIG. 6, the roller 501 comprises a shaft 5011 and a rotary table 5012. The shaft 5011 propels the rotary table 5012 to rotate, driving the substrate 201 to move in a horizontal direction.

As shown in FIG. 5, the drying chamber 205 comprises an entrance 502 and an exit 503 through which the substrate 201 is put into or taken out of the drying chamber 205 in this embodiment. The substrate 201 driven by the roller 501 is put into the drying chamber 205 via the entrance 502. After being heated through electromagnetic radiation produced by the plurality of magnetrons 204, the substrate 201 is taken out of the drying chamber 205 via the exit 503.

Referring to FIG. 5 to FIG. 6, the working principle of the second preferred embodiment of the present invention is explained as follows:

The gas circulation device is switched on for the gas to be injected into the drying chamber 205 through the inlet pipe 206 and to be expelled through the exhaust pipe 207. The gas circulation device keeps operations.

The substrate 201 coated with the alignment liquid is put on the roller 501 near the entrance 502 with a robotic arm. Afterwards, the substrate 201 driven by the roller 501 is put into the drying chamber 205 completely via the entrance 502.

The plurality of magnetrons 204 are turned on and start to operate after the substrate 201 is put into the drying chamber 205 completely. The alignment liquid on the substrate 201 is directly heated through electromagnetic radiation produced by the plurality of magnetrons 204. Meanwhile, the gas heated by the plurality of magnetrons 204 flows to the alignment liquid. The internal temperature of the drying chamber 205 is detected with the temperature control device. The power of the plurality of magnetrons 204 is controlled depending upon the internal temperature of the drying chamber 205.

The alignment liquid on the substrate 201 forms the alignment film after being completely dried. At this time, the plurality of magnetrons 204 stop operating, and the roller 501 starts to operate again. The substrate 201 driven by the roller 501 is taken out of the drying chamber 205 via the exit 503.

In this embodiment, the present invention provides the following benefits:

(A2) The alignment liquid is directly heated through electromagnetic radiation produced by the plurality magnetrons 204, resolving the problem that the thickness of the alignment film is not uniform because the alignment liquid is not evenly heated while the thermal energy is conducted from the substrate 201 to the alignment liquid.

(B2) The alignment liquid is directly heated through electromagnetic radiation produced by the plurality magnetrons 204 so that the uniformity of the drying effect on the alignment film is not affected.

(C2) The alignment liquid is directly heated through electromagnetic radiation produced by the plurality magnetrons 204 so the heat loss is little, improving the heating speed.

Figure 7:
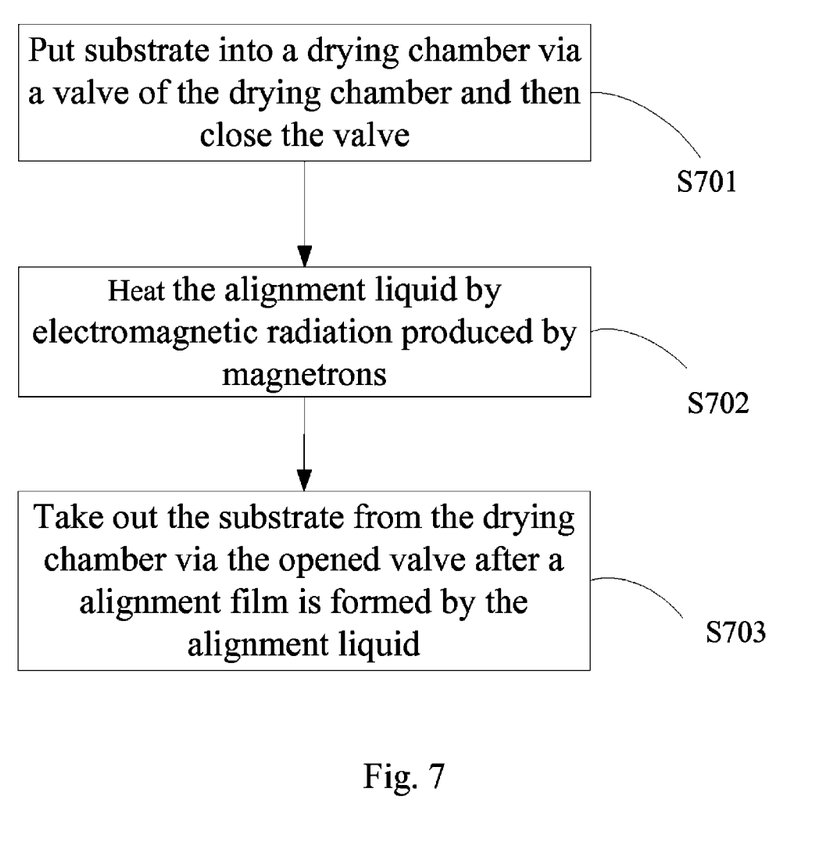
FIG. 7 is a flow chart showing an alignment film drying method for LCDs according to the first preferred embodiment of the present invention.

FIG. 7 is a flow chart showing an alignment film drying method for LCDs according to the first preferred embodiment of the present invention. The alignment film drying method corresponds to the schematic diagram of the alignment film drying system as shown in FIG. 2 and FIG. 3.

In Step S701, the substrate is put into the drying chamber via the valve of the drying chamber and the valve is closed.

The plurality of alignment film coating areas are disposed on the substrate and are coated with the alignment liquid used for forming alignment films.

In Step S702, the alignment liquid on the plurality of alignment film coating areas is heated through electromagnetic radiation produced by the plurality of magnetrons.

While the alignment liquid on the plurality of alignment film coating areas is heated through electromagnetic radiation, the gas is injected into the drying chamber through the inlet pipe for the practical process. The gas is heated by the plurality of magnetrons and flows to the alignment liquid, implementing the drying for the alignment liquid. Finally, the heated gas is expelled through the exhaust pipe.

While the alignment liquid on the plurality of alignment film coating areas is heated through electromagnetic radiation, the temperature-feedback sensor detects the internal temperature of the drying chamber to prevent the temperature of the alignment liquid from rising too high for the practical process. The alignment liquid will not boil too fast in case that the electromagnetic radiation is produced excessively. Thus, the best effect of drying on the alignment liquid is achieved.

Once the temperature-feedback sensor discovers that the internal temperature of the drying chamber exceeds a threshold for the alignment film drying system (e.g., above 180° C.), the thermostat will cool down the drying chamber. Also, the internal temperature of the drying chamber can be lowered by controlling the power of the plurality of magnetrons.

In Step S703, the substrate is taken out of the drying chamber via the opened valve after the alignment liquid forms the alignment film.

Figure 8:
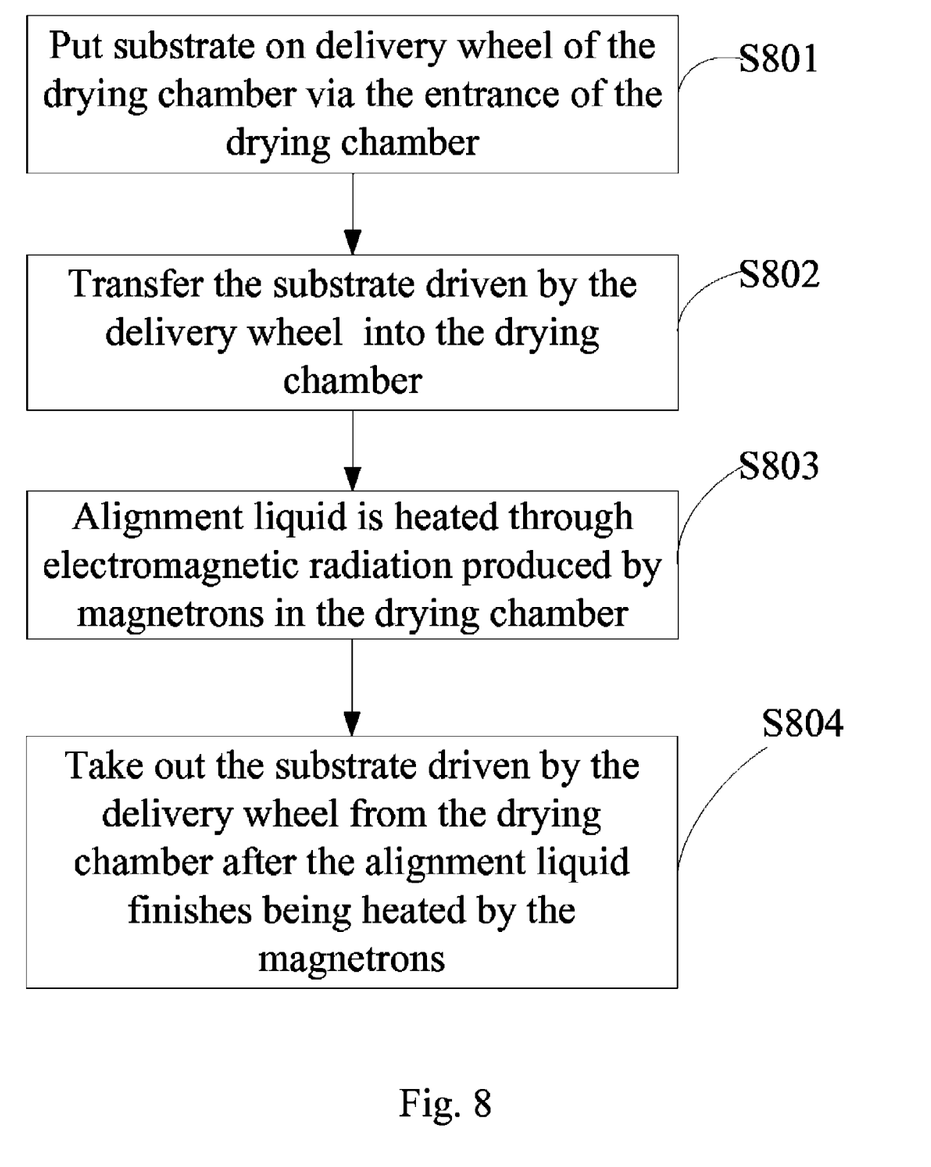
FIG. 8 is a flow chart showing an alignment film drying method for LCDs according to the second preferred embodiment of the present invention.

FIG. 8 is a flow chart showing an alignment film drying method for LCDs according to the second preferred embodiment of the present invention. The alignment film drying method corresponds to the schematic diagram of the alignment film drying system as shown in FIG. 5 and FIG. 6.

In Step S801, the substrate is put on the roller of the drying chamber via the entrance of the drying chamber.

The plurality of alignment film coating areas are disposed on the substrate and are coated with the alignment liquid used for forming alignment films.

In Step S802, the substrate driven by the roller is transferred into the drying chamber.

In Step S803, the alignment liquid is heated through electromagnetic radiation produced by the plurality of magnetrons in the drying chamber.

While the alignment liquid on the plurality of alignment film coating areas is heated through electromagnetic radiation, the gas is injected into the drying chamber through the inlet pipe for the practical process. The gas is heated by the plurality of magnetrons and flows to the alignment liquid, implementing the drying for the alignment liquid. The heated gas is expelled through the exhaust pipe.

While the alignment liquid on the plurality of alignment film coating areas is heated through electromagnetic radiation, the temperature-feedback sensor detects the internal temperature of the drying chamber to prevent the temperature of the alignment liquid from rising too high for the practical process. The alignment liquid will not boil too fast in case that the electromagnetic radiation is produced excessively. Thus, the best effect of drying on the alignment liquid is achieved.

Once the temperature-feedback sensor discovers that the internal temperature of the drying chamber exceeds a threshold for the alignment film drying system (e.g., above 180° C.), the thermostat will cool down the drying chamber. Furthermore, the internal temperature of the drying chamber 205 can be lowered by controlling the power of the plurality of magnetrons 204.

In Step S804, the substrate driven by the roller is taken out of the drying chamber after the alignment liquid finishes being heated by the plurality of magnetrons.

In contrast to prior art, the alignment liquid is directly heated through electromagnetic radiation produced by the plurality of magnetrons in the present invention, which resolving the problem that the thickness of the alignment film is not uniform because the alignment liquid is not evenly heated while the thermal energy is conducted to the alignment liquid from the substrate. Also, the uniformity of the drying effect on the alignment film is not affected by the plurality of support pins, and the heat loss is little, shortening the heating time.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An alignment film drying system, for drying an alignment liquid coated on a substrate, characterized in that: the alignment film drying system comprises a plurality of magnetrons, the alignment liquid is coated on one side of the substrate facing the plurality of magnetrons, and the alignment liquid is heated through electromagnetic radiation produced by the magnetron to form an alignment film,
wherein the plurality of magnetrons align as a honeycomb.

2. The alignment film drying system of claim 1, characterized in that: the alignment film drying system further comprises a drying chamber in which the plurality of magnetrons are placed.

3. The alignment film drying system of claim 2, characterized in that: the alignment film drying system further comprises a gas circulation device comprising an inlet pipe and an exhaust pipe, the plurality of magnetrons are placed in a gap between the substrate and the inlet pipe, the inlet pipe is used for being a passage through which a gas is injected to the drying chamber, the gas flows to the alignment liquid on the substrate after being heated by the plurality of magnetrons and dries the alignment liquid, and the heated gas is expelled through the exhaust pipe.

4. The alignment film drying system of claim 2, characterized in that:
the alignment film drying system further comprises a temperature control device comprising a temperature-feedback sensor and a thermostat;
the temperature-feedback sensor is used for detecting the internal temperature of the drying chamber; and
the thermostat is used for lowering the temperature once the temperature-feedback sensor discovers that the internal temperature of the drying chamber exceeds a threshold for the alignment film drying system.

5. The alignment film drying system of claim 2, characterized in that:
the drying chamber comprises a roller inside;
the drying chamber further comprises an entrance and an exit so that the substrate is put into or taken out of the drying chamber via the entrance and the exit, the substrate driven by the roller being put into the drying chamber via the entrance, being heated through electromagnetic radiation produced by the plurality of magnetrons, and then being taken out of the drying chamber.

6. The alignment film drying system of claim 2, characterized in that:
inner walls of the drying chamber are coated with an electromagnetic radiation absorbing material;
the drying chamber comprises a valve: and
the valve comprises a seal for preventing the electromagnetic radiation inside the drying chamber from leaking outside while the valve is closed.

7. An alignment film drying system for drying an alignment liquid coated on a substrate, comprising a plurality of magnetrons, the alignment liquid being coated on one side of the substrate facing the plurality of magnetrons, the alignment liquid being heated through electromagnetic radiation produced by the magnetron to form an alignment film;
the alignment film drying system comprising a drying chamber in which the plurality of magnetrons are placed;
the alignment film drying system farther comprising a temperature control device comprising a temperature-feedback sensor for detecting the internal temperature of the drying chamber, and a thermostat for lowering the temperature once the temperature-feedback sensor discovers that the internal temperature of the drying chamber exceeds a threshold for the alignment film drying system;

the drying chamber comprising a roller inside;

the drying chamber further comprising an entrance and an exit so that the substrate is put into or taken out of the drying chamber via the entrance and the exit, the substrate driven by the roller being put into the drying chamber via the entrance, being heated through electromagnetic radiation produced by the plurality of magnetrons, and then being taken out of the drying chamber, wherein the plurality of magnetrons align as a honeycomb.

8. The alignment film drying system of claim 7, characterized in that: the alignment film drying system further comprises a gas circulation device comprising an inlet pipe and an exhaust pipe, the plurality of magnetrons are placed in a gap between the substrate and the inlet pipe, the inlet pipe is used for being a passage through which a gas is injected to the drying chamber, the gas flows to the alignment liquid on the substrate after being heated by the plurality of magnetrons and dries the alignment liquid, and the heated gas is expelled through the exhaust pipe.

* * * * *